July 18, 1950  W. G. COOK  2,515,987
MOTOR CONTROL SYSTEM
Filed March 8, 1947  2 Sheets-Sheet 1

WITNESSES:

INVENTOR
Willard G. Cook.
ATTORNEY

July 18, 1950  W. G. COOK  2,515,987
MOTOR CONTROL SYSTEM
Filed March 8, 1947  2 Sheets-Sheet 2

WITNESSES:

INVENTOR
Willard G. Cook.
BY
ATTORNEY

Patented July 18, 1950

2,515,987

UNITED STATES PATENT OFFICE 2,515,987

MOTOR CONTROL SYSTEM

Willard G. Cook, Pittsburgh, Pa., assignor to Westinghouse Electric Corporation, East Pittsburgh, Pa., a corporation of Pennsylvania Application March 8, 1947, Serial No. 733,382

7 Claims. (Cl. 318—45)

My invention relates, generally, to motor control systems, and it has reference, in particular, to control systems for twin motor drives such as may be used in rolling mills and the like.

Generally stated, it is an object of my invention to provide an improved control system for a pair of motors driving a common load such as the rolls of a single roll stand in a rolling mill.

More specifically, it is an object of my invention to provide for energizing the armatures of a pair of motors driving the upper and lower rolls, respectively, of a roll stand from separate generator busses, and to effect a desired division of the load between the motors.

Another object of my invention is to provide for energizing the motors driving the upper and lower rolls of a roll stand from separate generator busses so as to improve the operating stability of the system in installations requiring large amounts of power.

Yet another object of my invention is to provide for reducing the short circuit fault current capacity of motor control systems used in rolling mill drives.

It is also an object of my invention to provide for increasing the capacity of rolling mill drives by utilizing a plurality of generators for energizing each of a pair of mill motors driving a common load from separate busses.

It is also an important object of my invention to provide for separately energizing the armatures of each of a pair of roll driving motors from cross-connected generators, and for energizing the field windings of each of the motors cumulatively and differentially in accordance with their own load and the load of the other motor, respectively, in order to obtain the proper load division therebetween.

Yet another important object of my invention is to provide for energizing the motors driving the upper and lower rolls of a roll stand from separate generators, and for effecting the proper division of load between the motors by using load balancing field windings on the generators.

Other objects will in part be obvious, and will in part be explained hereinafter.

In practicing my invention in one of its forms, the armature of a motor driving the upper roll of a roll stand is energized from a pair of generators connected in parallel circuit relation. The armature of the motor driving the lower roll is energized from a separate pair of generators also connected in parallel circuit relation. The field windings of the motors are energized from separate exciters each of which has a cumulative field winding energized in accordance with the load on the one motor with which it is associated, and a differential field winding energized in accordance with the load on the other motor.

For a more complete understanding of the nature and scope of my invention, reference may be made to the following detailed description which may be studied in connection with the accompanying drawings, in which.

Figure 1:
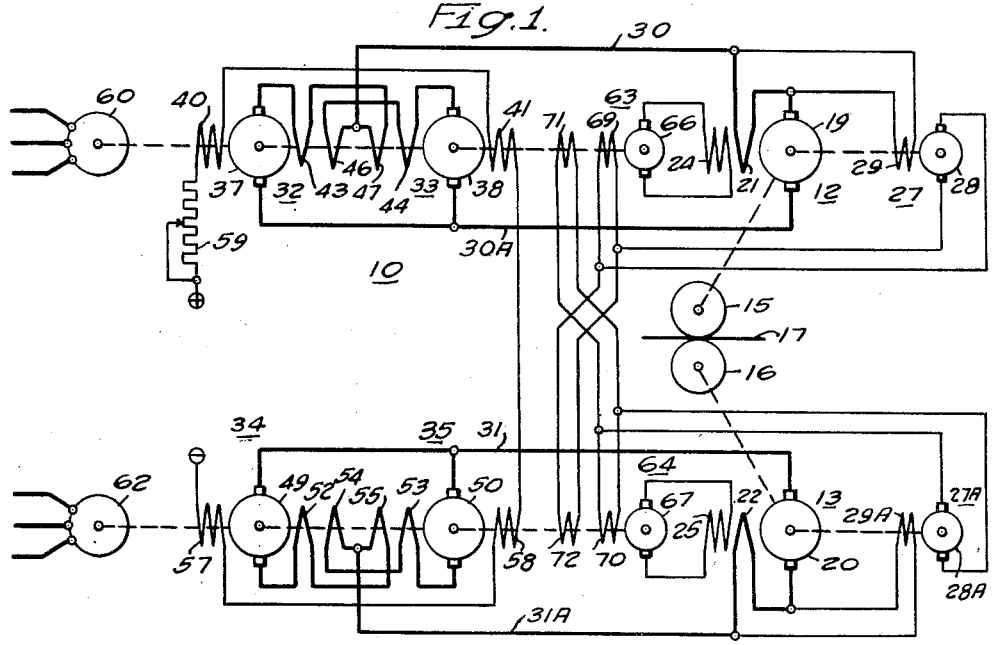
Figure 1 is a diagrammatic view of a twin motor control system embodying the invention in a preferred form.

Referring to Figure 1, the reference numeral 10 may denote, generally, a motor control system wherein motors 12 and 13 are operatively connected for driving a common load such as, for example, the upper and lower rolls 15 and 16, respectively, of a stand in a rolling mill for rolling a piece of material 17.

The roll motors 12 and 13 may be of any suitable type being provided, for example, with armatures 19 and 20, together with compensating field windings 21 and 22, and main field windings 24 and 25, respectively. Pilot generators 27 and 27A having armatures 28, 28A and field windings 29, 29A, may be operatively connected to the roll motors 19 and 20, respectively. Energization of the field windings 29 and 29A may be effected by connecting them across the compensating field windings 21 and 22, respectively, in order to control the output of the pilot generators in accordance with the speed and load of their respective motors.

In order to effect energization of the motor armatures 19 and 20, they may be connected to separate generator busses 30, 30A and 31, 31A. Electrical energy may be supplied to the busses 30, 30A and 31, 31A by means of pairs of generators 32, 33 and 34, 35, respectively. The generators 32 and 33 may be connected between the busses 30 and 30A, and provided with shunt field windings 40 and 41, together with differential field windings 43 and 44 and cumulative field windings 46 and 47. The differential field windings 43 and 44 may be connected in circuit relation with the armatures 37 and 38 of the generators, 32 and 33, respectively. The cumulative field windings 46 and 47 may be cross connected in circuit relation with the armatures 38 and 37 of the generators 33 and 32, respectively. Thus it will be seen that each of the differential field windings is connected in series circuit relation with the armature of its own generator, while each cumulative field winding is connected in series circuit relation with the armature of the other generator.

In a similar manner, the pair of generators 34 and 35 may comprise armatures 49 and 50 connected in parallel circuit relation between the generator busses 31 and 31A. Generators 34 and 35 are provided with differential field windings 52 and 53 connected in series circuit relation with the armatures of their own or respective generators, and cumulative field windings 54 and 55 cross connected in series circuit relation with the armature of the other generator. Generators 34 and 35 are provided with shunt field windings 57 and 58 connected in series circuit relation together with the shunt field windings 40 and 41 of the generators 32 and 33.

The shunt field windings of the several generators may be connected to any suitable source of electrical energy, and a suitable field rheostat 59 utilized for controlling the energization thereof.

A suitable motor 60 may be utilized to drive the generators 32 and 33, while the generators 34 and 35 may be driven by a motor 62.

In order to provide for obtaining a proper division of load between the roll motors 12 and 13, the field windings 24 and 25 thereof may be energized by means of series-type exciters 63 and 64, respectively, having armatures 66 and 67 with cumulative field windings 69, 70 and differential field windings 71, 72. The cumulative field winding 69 of exciter 63 may be cross connected with the differential field winding 72 of exciter 64 and both connected in parallel circuit relation to the pilot generator 27, as shown. Likewise the cumulative field winding 70 of exciter 64 may be cross connected with the differential field winding 71 of exciter 63 and both connected in parallel circuit relation with the pilot generator 27A. The exciters 63 and 64 may be driven in any suitable manner being, for example, respectively connected to the motors 60 and 62 which drive the main generators.

In the operation of the system, the division of load between the main generators 32, 33 and 34, 35 is effected by the cross connection of their cumulative field windings 46, 47 and 54, 55, respectively. Any tendency of one generator of either pair to take more than its share of load automatically increases the output of the other generator to maintain a predetermined load balance therebetween.

In the case of the roll motors, load division is effectively maintained by the cross connection of the cumulative and differential field windings of the series-type exciters, as described hereinbefore. Since the voltages of the generator busses may be readily maintained within a few volts of each other, any differential between the loads on the roll motors 12 and 13 will produce a change in the output of one or the other of the pilot generators 27 and 27A. For example, considering that the roll motors 12 and 13 are sharing the total load equally or in some other desired ratio, any increase in the load on the roll motor 12 results in increased energization of the field winding 29 of its associated pilot generator 27. This increases the energization of the cross-connected field windings 69 and 72 of the series-type exciters 63 and 64, respectively. Since the field winding 69 is cumulative, the energization of the main field winding 24 of the roll motor 12 is increased. This increases the excitation of the motor, thereby increasing its counter E. M. F. which opposes and decreases its load current. At the same time, increased energization of the differential field winding 72 of the series-type exciter 64 results in decreased energization of the main field winding 25 of the roll motor 13. This causes the motor 13 to increase its load current in the same manner except that in this instance its counter E. M. F. is decreased.

Figure 2:
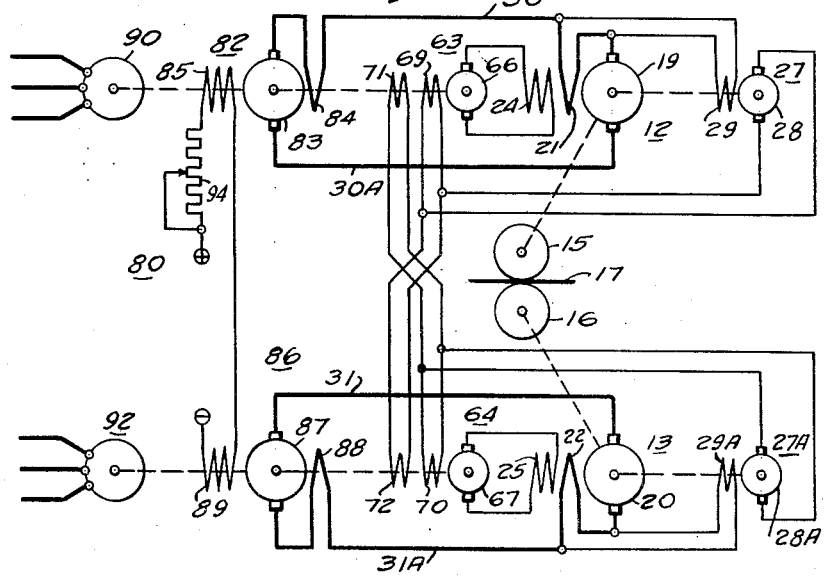
Fig. 2 is a diagrammatic view of a twin motor control system embodying the invention in another of its forms.

Referring to Fig. 2, the reference numeral 80 may denote, generally, a motor control system wherein a pair of motors 12 and 13 are operatively connected for driving the upper and lower rolls 15 and 16, respectively, of a roll stand handling a piece or length of material 17. The motors 12 and 13 may be provided with pilot generators 27 and 27A having field windings 29 and 29A connected as described hereinbefore across the compensating field windings 21 and 22 of the motors 12 and 13, respectively. Energization of the main field windings 24 and 25 of the roll motors may be affected by means of series-type exciters 63 and 64 having cumulative field windings 69 and 70 each energized from their respective pilot generators 27 and 27A. The series-type exciters may also be provided with differential field windings 71 and 72, each of which may be energized from the pilot generator of the other motor so as to effectively obtain the proper load division between the motors, as described hereinbefore with reference to Figure 1.

Instead of energizing each of the roll motors 12 and 13 from a plurality of main generators, a single main generator 82 having an armature 83, a series field winding 84 and a short field winding 85, may be utilized for energizing the generator bus 30, 30A. A separate main generator 86 comprising an armature 87, a series field winding 88 and a shunt field winding 89 may be utilized for energizing the generator bus 31, 31A. A suitable motor 90 may be provided for driving the main generator 82 and the exciter 63. A motor 92 may be provided for driving the main generator 86 and the exciter 64. The shunt field windings 85 and 89 of the main generators may be connected in series circuit relation to a suitable source of electrical energy through a suitable field rheostat 94.

The control system shown in Fig. 2 operates substantially in the same manner as the system shown in Figure 1. Where a single main generator is used to energize each of the generator busses, the cross connections used for balancing the division of load between the parallel connected main generators shown in Figure 1 are not necessary. The proper division of load between the roll motors which are mechanically tied together through the rolls and material may be readily maintained by the functioning of the cross-connected excitation system of the series-type exciters.

Figure 3:
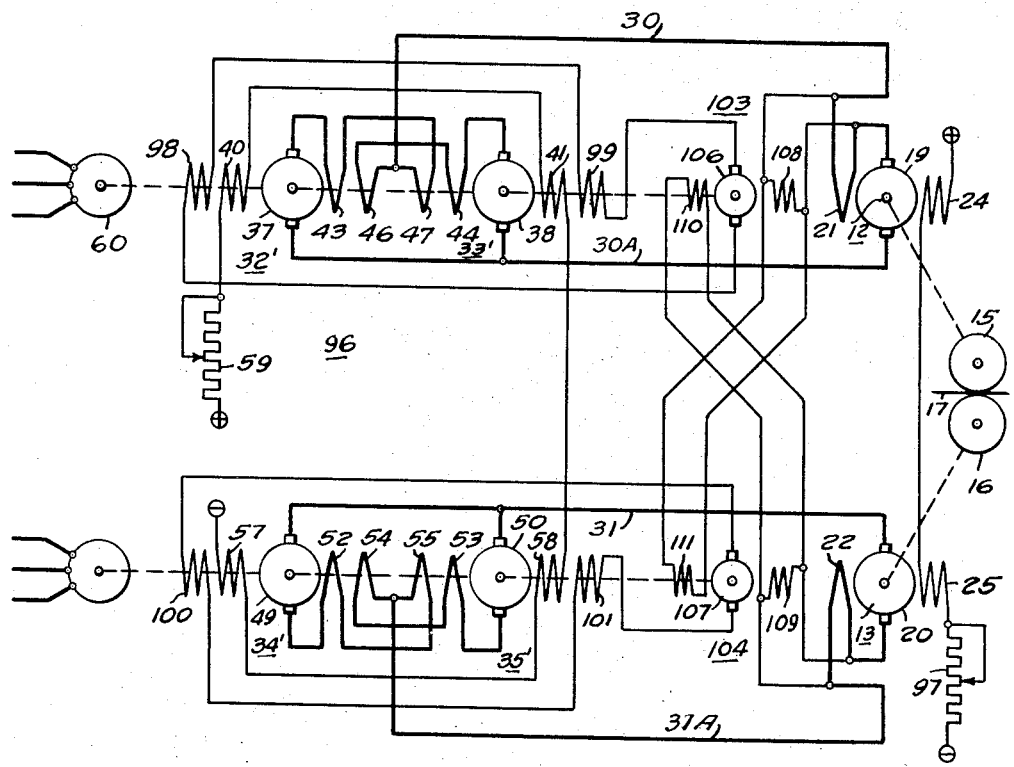
Fig. 3 is a diagrammatic view of a twin motor control system embodying the invention in yet another form.

Referring to Fig. 3 of the drawings, the reference numeral 96 may denote, generally, a motor control system for the motors 12 and 13 which drive rolls 15 and 16 of a roll stand for rolling a length or piece of material 17.

The armatures 19 and 20 of the roll motors may be connected to generator busses 30, 30A and 31, 31A, respectively, while the main field windings 24 and 25 thereof may be connected to a suitable source of electrical energy through a field rheostat 97.

The busses 30, 30A and 31, 31A may be separately energized by pairs of parallel-connected main generators 32', 33' and 34', 35', respectively. The generators 32' and 33' may comprise armatures 37 and 38, shunt field windings 40 and 41, differential field windings 43 and 44, cumulative field windings 46 and 47, and balancing field windings 98 and 99, respectively. The generators 34' and 35' may comprise armatures 49 and 50, shunt field windings 57 and 58, differential field windings 52 and 53, cumulative field windings 54 and 55, and balancing field windings 100 and 101, respectively.

The differential field winding of each main generator may be, as hereinbefore described, connected in circuit relation with the armature of its own generator while the cumulative field winding of each generator is connected in circuit relation with the other generator of the pair. The shunt field windings may be connected in series circuit relation to a suitable source of electrical energy through a field rheostat 59.

In this embodiment of the invention, the balancing field windings 98, 99 and 100, 101 may be energized from control generators or exciters 103 and 104, respectively, having armatures 106, 107, differential field windings 108, 109 and cumulative field windings 110, 111, respectively. The differential field winding of each of the control generators 103 and 104 is connected across the compensating field winding of its associated roll motor and cross connected to the cumulative field winding of the other control generator as shown. Thus the differential field winding 108 is connected across the compensating field winding 21 of roll motor 12 and in parallel circuit relation with the cumulative field winding 110 of control generator 107 and the differential field winding 111 of control generator 104 is connected across the compensating field winding 22 of roll motor 13 and in parallel circuit relation with the cumulative field winding of control generator 103.

It will be apparent that, when the roll motors 12 and 13 are dividing the total load in the desired ratio, the output voltages of the control generators 106 and 107 are substantially zero as their cumulative and differential field windings normally balance each other; however, when roll motor 12, for example, takes more than its proper or desired share of the total load, the field windings 108 and 111 will predominate. Accordingly, the outputs of the control generators 103 and 104 will be such as to make the balancing field windings 98 and 99 differential, and the balancing field windings 100 and 101 cumulative. The voltage of the generators 32' and 33' is reduced which reduces the voltage applied to the armature of the roll motor 12. This causes the motor 12 to reduce its load accordingly. The opposite is true with respect to the roll motor 13. The voltage of the generators 34' and 35' increases which increases the voltage applied to the armature of roll motor 13. The load on this motor is increased accordingly. This results in the maintenance of the proper or desired load division between the roll motors.

From the above description and the accompanying drawing, it will be apparent that I have provided a simple and effective system for controlling the operation of the roll motors in twin motor drives, such as are used in rolling mills, and in which the motors are mechanically tied together. By using separate generators or separate generator busses for each of the roll motors, greater operating stability may be obtained. In addition, the maximum fault current upon the occurrence of any fault on the generator bus will be greatly reduced due to the separation of the sources of energy for the two roll motors. By energizing the roll motors from separate busses, a greater total amount of electrical energy may be made available without decreasing the stability of the generating system, since the number of generators operating in parallel may be reduced. Since any difference in voltage between two busses may be easily kept down to a value of one or two volts and this slight differential may be readily taken care of by the load balancing excitation system of the motors or generators, no elaborate precautions are necessary to obtain an exact balance of voltages between the separate generator busses. Because of this the control system may be greatly simplified and it is rendered more flexible in its application.

Since certain changes may be made in the above-described constructions, and different embodiments of the invention may be made without departing from the spirit and scope thereof, it is intended that all the matter contained in the above description and shown in the accompanying drawing shall be considered as illustrative and not in a limiting sense.

I claim as my invention:

1. For use with a pair of motors having armatures connected to drive the upper and lower rolls of a rolling mill respectively and having field windings, circuit means connecting the armature of the motor driving the upper roll to a generator, circuit means connecting the armature of the other motor to another generator having similar output characteristics to the first-mentioned generator, circuit means connected in association with each of the motors operable to produce a voltage proportional to the load on and the speed of said motor, and generating means connected to energize the field windings of said motors, said generating means each having excitation means connected to be cumulatively and differentially responsive to the voltage proportional to the load on the motor associated with the other generating means and to the voltage proportional to the load on its associated motor, respectively.

2. In a control system for a pair of motors having armatures arranged to drive the upper and lower rolls of a rolling mill respectively and having field windings, a pair of generators connected in parallel circuit relation in circuit with one of the armatures, a separate pair of similar generators connected in parallel circuit relation in circuit with the other of the armatures, circuit means connected to produce control voltages proportional to the loads on each of said motors and to the speed of said motors, and generating means connected to energize the field windings of the motors, each of said generating means having excitation means connected to be differentially responsive to the control voltage responsive to the load on its associated motor and cumulatively responsive to the control voltage responsive to the load on the other motor.

3. For use with a pair of motors having armatures arranged to drive the upper roll and the lower roll of a rolling mill respectively and having field windings, a plurality of main generators connected to supply electrical energy to each armature, said main generators having cross-connected field windings connected in parallel circuit relation with each other in circuit with each armature and load balancing field windings, circuit means connecting the field windings of each of the motors to a source of electrical energy, and control means connected to energize the balancing field windings of each of the pairs of generators including a control generator associated with each motor having excitation means connected to be differentially responsive to the load of the associated motor and cumulatively responsive to the load on the other motor.

4. In a rolling mill drive, a pair of motors having field windings and armatures connected to drive a pair of associated rolls, circuit means connecting one of the armatures to a power source having predetermined operating characteristics, additional circuit means connecting the other armature to a separate power source having similar operating characteristics, a pilot generator for each motor driven by said motor and having a field winding, circuit means connecting the field windings of the pilot generators for energization in accordance with the armature currents of the motors with which they are associated, and generating means having excitation means connected to be so energized by the pilot generators that said generating means energize the field winding of each motor differentially with respect to the armature current of its respective motor and cumulatively with respect to the armature current of the other motor.

5. In a control system for a pair of motors having field windings and armatures operatively connected to the upper and lower rolls respectively of a roll stand, a main generator connected to energize the armature of one of the motors, a separate main generator connected to energize the armature of the other motor, a pilot generator driven by each motor having a field winding energized in accordance with the armature current of its respective motor, a control generator connected to energize the field winding of each motor and having a pair of field windings, and circuit means connecting one field winding of each control generator to the pilot generator of its respective motor for differential energization and the other field winding to the pilot generator of the other motor for cumulative energization.

6. In a drive for a rolling mill having a pair of rolls arranged to cooperate in rolling a piece of material, a pair of motors each having a field winding and an armature arranged to drive a different one of said rolls, means comprising a pair of generators arranged in cross-connected parallel circuit relation and connected to energize the armature of one of the motors, additional means comprising a pair of generators separate from the aforesaid pair but having substantially similar operating characteristics arranged in cross-connected parallel circuit relation and connected to energize the armature of the other motor, a pilot generator driven by each motor and having a field winding energized in accordance with the armature current of its respective motor, a series-type generator connected to energize the field winding of each motor, each of said series-type generators having a pair of field windings, circuit means connecting one field winding of each of the series-type generators to the pilot generator of its respective motor for differential energization, and additional circuit means connecting the other field winding of each of the series-type generators to the pilot generator of the other motor for energization in cumulative relation.

7. In a control system, a pair of motors having armatures connected respectively to the two rolls of a roll stand and having field windings connected to a suitable source of electrical energy, a pair of generators connected in cross-connected parallel circuit relation to the armature of one of the motors and having load balancing field windings, another pair of generators connected in cross-connected parallel circuit relation to the armature of the other motor and having load balancing field windings, a control generator associated with each motor having a differential field winding energized in accordance with the armature current of its associated motor and a cumulative field winding energized in accordance with the armature current of the other motor, and circuit means connecting the load balancing field winding of the generators of each pair in circuit with the associated control generator to reduce the output voltage of said generators whenever their associated motor takes too great a share of the load.

WILLARD G. COOK.

REFERENCES CITED

The following references are of record in the file of this patent:

UNITED STATES PATENTS

| Number | Name | Date |
| --- | --- | --- |
| 1,953,792 | Winne et al. | Apr. 3, 1934 |
| 2,070,323 | Stokes | Feb. 9, 1937 |
| 2,238,406 | Wright | Apr. 15, 1941 |
| 2,305,937 | Montgomery et al. | Dec. 22, 1942 |

FOREIGN PATENTS

| Number | Country | Date |
| --- | --- | --- |
| 518,617 | France | Jan. 6, 1921 |